United States Patent [19]
Teresi

[11] Patent Number: 6,123,547
[45] Date of Patent: Sep. 26, 2000

[54] STATIONARY DRAG RACING SIMULATION SYSTEM

[75] Inventor: Joseph Teresi, Fort Lauderdale, Fla.

[73] Assignee: Teresi Publications, Inc., Wilmington, Del.

[21] Appl. No.: 09/217,086

[22] Filed: Dec. 21, 1998

[51] Int. Cl.[7] ........................................ G09B 9/04
[52] U.S. Cl. ........................................ 434/61
[58] Field of Search ................ 454/61, 62, 64, 454/66, 67, 70, 29; 472/85; 104/53, 60

[56] References Cited

U.S. PATENT DOCUMENTS

| | | | |
|---|---|---|---|
| 3,606,328 | 9/1971 | Delphia | 463/60 |
| 3,940,978 | 3/1976 | Akkerman | 73/117 |
| 4,082,265 | 4/1978 | Berkes | 482/61 |
| 4,134,230 | 1/1979 | Roy | 472/85 |
| 4,415,152 | 11/1983 | Smith | 482/61 |
| 4,846,686 | 7/1989 | Adams | 434/69 |
| 5,015,189 | 5/1991 | Wenzinger | 434/63 |
| 5,089,960 | 2/1992 | Sweeney | 364/410 |
| 5,209,662 | 5/1993 | Fujita | 434/61 |
| 5,240,417 | 8/1993 | Smithson | 434/61 |
| 5,299,810 | 4/1994 | Pierce | 273/434 |
| 5,364,271 | 11/1994 | Aknin | 434/61 |
| 5,415,550 | 5/1995 | Aoki | 434/61 |
| 5,547,382 | 8/1996 | Yamasaki | 434/61 |
| 5,660,547 | 8/1997 | Cooperman | 434/29 |
| 5,865,624 | 2/1999 | Hayashigawa | 434/66 |

*Primary Examiner*—Kien T. Nguyen
*Assistant Examiner*—Kurt Fernstrom
*Attorney, Agent, or Firm*—Fulwider Patton Lee & Utecht, LLP

[57] ABSTRACT

The vehicle drag racing simulation system includes a restraining assembly that allows for realistic, simulation of racing of vehicles, such as motorcycles, that allows for limited freedom of movement of the vehicles while remaining generally stationary within a racing simulation area, allowing yaw, pitch and roll movement, as well as movement vertically and horizontally, forward and backward, and side-to-side, so that skill is also involved in riding or driving the vehicles even though they are stationary. A rotatable drive wheel support member is also provided for rotatably engaging the drive wheels of the vehicles. A monitor is provided for monitoring the progress of the simulated drag racing, and a control unit is provided for controlling the monitor and the drag racing simulation. Brakes can also be provided for stopping the competition. The racing platform includes a burnout area at the rear of the racing platform, with flaps that can be raised for restraining the vehicles during a burnout period.

71 Claims, 3 Drawing Sheets

STATIONARY DRAG RACING SIMULATION SYSTEM

BACKGROUND OF THE INVENTION

1. Field of the Invention

This invention relates generally to vehicle drag racing simulation systems, and more particularly concerns drag racing simulation systems for simultaneous competition of two or more vehicles, such as for racing of cars, trucks, bicycles and the like, and for measuring the horsepower and simulated speed in a stationary competitive situation, such as for simulating performance in a quarter-mile race.

2. Description of Related Art

Drag racing of vehicles such as automobiles and motorcycles has long been a popular sport, and has developed from impromptu street racing to a high performance, commercial event often staged in a special stadium with a track for the actual competition, and burnout areas for preparation of tires prior to racing. However, as the horsepower and speeds of such vehicles have increased, so have the risks grown to the individual competitors. Advances in safety strategies and equipment have partially limited these risks, but are not readily available to members of the public who may desire to test their amateur skills and their own vehicles in head to head competition. A need has therefore arisen for a way of safely simulating drag racing of vehicles.

In one approach to simulation of drag racing of vehicles, two automobiles simulate racing conditions using dynamometer equipment instead of an open roadway. Two adjacent stalls for the automobiles are provided, with dynamometric traction means in each stall for engaging the rear wheels of the automobiles. A distance monitor with an indicator provide for indication of progress of the simulated race, as well as the results of the race. No particular skill is called for in steering the automobiles, since they are securely engaged in position in their stalls so that their simulated progress can be monitored by the dynamometer equipment.

A bicycle racing simulator is also known that provides for the simultaneous riding of one or more cycles to simulate competitions within a limited area. The driving wheel of each cycle drives a fluid pump, allowing close monitoring of the efforts of each cyclist. Indications given by the level of the liquid in a column filled by the fluid pump provide an indication of simulated distance traveled by the vehicle. However, very little freedom of movement of the cycles are tolerated, so that the cycles must remain in a relatively fixed position, and in order to prevent vacillation, the cycles may be mounted on pinions.

Another similar bicycle training and exercise device is known in which a conventional bicycle is mounted and restrained for exercise and/or riding training. The rear wheel is engaged between two rear rollers, preventing forward and back movement of the bicycle in a longitudinal direction. A moving roller supported beltway for the front wheel simulates a roadway surface and is powered by the rear traction wheel of the bicycle or by an independent drive device. The device includes a horizontal moving beltway consisting of an endless moving belt supported by rollers. The rollers prevent the rider from steering the bicycle off of the moving belt, and prevent the bicycle wheels from skidding off the belt. Restraint chains are attached to the frame of the bicycle, enabling limited steering and tilting of the bicycle for training purposes, while maintaining the orientation of the bicycle within safe limits to prevent injury to the rider.

Another known road simulation device is used for testing and demonstration of the operation of a driverless, stationary motorcycle. After the motorcycle is rolled onto the entrance ramp and positioned in an upright manner such that the front tire rests in a longitudinal motorcycle support channel that does not permit rotation of the front tire, the rear tire is rotatably supported upon two rollers.

It is thus apparent that what has been needed and heretofore unavailable in the prior art is a stationary drag racing simulation system that offers a challenging and realistic ride, and that is capable of handling one or more contestants. There thus remains a need for a system and method for simulation of drag racing for simultaneous competition of two or more vehicles, such as motorcycles, that allows for limited yaw, pitch and roll movement of the vehicles, as well as vertical, and horizontal forward and backward and side-to-side movement, so that driving skills that would otherwise be needed in drag racing in an open roadway are also involved in riding or driving the vehicles even though they are substantially stationary. It would also be desirable to provide for monitoring the horsepower, simulated speed and progress of the contestants during competition. It would further be desirable to provide a racing platform for the drag racing simulation with a burnout area and means to restrain the vehicles during a burnout period to prepare the drive wheels of the vehicles for the race, air blowers can be provided at the front of the platform to blow air past the vehicles to cool them during competition, and means for facilitating entry and exit of the vehicles onto and off of the racing platform. The present invention meets these and other needs.

SUMMARY OF THE INVENTION

Briefly, and in general terms, the present invention provides for a realistic, vehicle drag racing simulation system for simultaneous competition of two or more vehicles, such as motorcycles, that allows for limited freedom of movement to yaw, pitch and roll, as well as vertical and horizontal forward and backward and side-to-side, so that skill is also involved in riding or driving the vehicles even though they are stationary.

The present invention accordingly provides for a drag racing simulation system for at least one vehicle, such as a motorcycle, having a drive wheel, for simulating drag racing while the vehicle remains generally stationary within a racing simulation area. A racing platform having a drag racing simulation area is provided, and in a presently preferred embodiment, the racing platform includes a plurality of drag racing simulation areas, for a plurality of vehicles, and can, for example, comprise a flatbed of a truck, so that the drag racing simulation system can itself be mobile. A restraining assembly is provided for securing the vehicles to the platform in a generally upright position while allowing substantial freedom of movement of the vehicles within the drag racing simulation area to allow limited yaw, pitch and roll movement of the vehicles, as well as vertical, and horizontal forward and backward and side-to-side movement. In a currently preferred embodiment, the restraining assembly comprises a plurality of posts disposed around the drag racing simulation area, and a plurality of elastic cords securing the vehicles to the posts.

A rotatable drive wheel support member is also provided in each drag racing simulation area, having an outer face for rotatably engaging the drive wheels of the vehicles. In a presently preferred embodiment, the rotatable drive wheel support member comprises a treadmill, although the rotatable drive wheel support member can also comprise a dynamometer, or a similar suitable device. Typically, the vehicle, such as a motorcycle, has a front wheel and a rear wheel, and the rear wheel is the drive wheel. In a presently preferred aspect of the invention, the rear wheel is restrained in rotating engagement with the rotatable drive wheel support member, while the front wheel can be secured to the racing platform or restrained in rotating engagement with a second rotatable support member. A presently preferred embodiment provides that a rotatable drive wheel support member comprises a first treadmill for the drive wheel, and the second rotatable support member comprises a second treadmill for the front wheel, linked to the first treadmill.

A monitor is also provided for monitoring the progress of the simulated drag racing, and in one preferred aspect, includes a control unit for controlling the monitor. One or more sensors are connected to the rotatable drive wheel support member for measuring parameters such as the rotational velocity of the drive wheel and the acceleration of the drive wheel, and the monitor can include means for displaying information about the drag racing simulation, such as one or more video monitors for displaying horsepower, revolutions per minute, simulated speed, and simulated forward progress of the vehicles. One presently preferred embodiment provides for a series of lights positioned in front of the vehicles for sequentially displaying the simulated forward progress of the vehicles. Brakes on the rotatable drive wheel support members are also preferably provided for bringing the vehicles to a halt and stopping the competition, and the control unit preferably includes means for controlling the brakes of the rotatable drive wheel support members. In addition, means can be electrically connected to the ignition control of the vehicle for controlling the supply of electrical ignition energy to the vehicle for stopping the operation of the vehicles in an emergency.

In another presently preferred aspect of the invention, the racing platform includes a burnout area at the rear of the racing platform, and the burnout area can includes one or more flaps capable of being raised for restraining the vehicles against forward movement during a burnout period. Air blowers may also be provided at the front of the racing platform for blowing air past the vehicles to cool the vehicles, and one or more lifts can be provided at the perimeter of the racing platform to facilitate entry and exit of the vehicles.

These and other aspects and advantages of the invention will become apparent from the following detailed description and the accompanying drawings, which illustrate by way of example the features of the invention.

DETAILED DESCRIPTION OF THE PREFERRED EMBODIMENTS

While systems for simulating racing of vehicles have improved the safety conditions above those for street or track drag racing of vehicles such as automobiles and motorcycles, such approaches generally have not provided a stationary drag racing simulation system that offers a challenging and realistic ride, that allows for limited yaw, pitch and roll movement of the vehicles, as well as vertical, and horizontal forward and backward and side-to-side movement, so that driving skills that would otherwise be needed in drag racing in an open roadway are also involved in riding or driving the vehicles even though they are substantially stationary, and that is capable of handling competition of one or more contestants.

Figure 1:
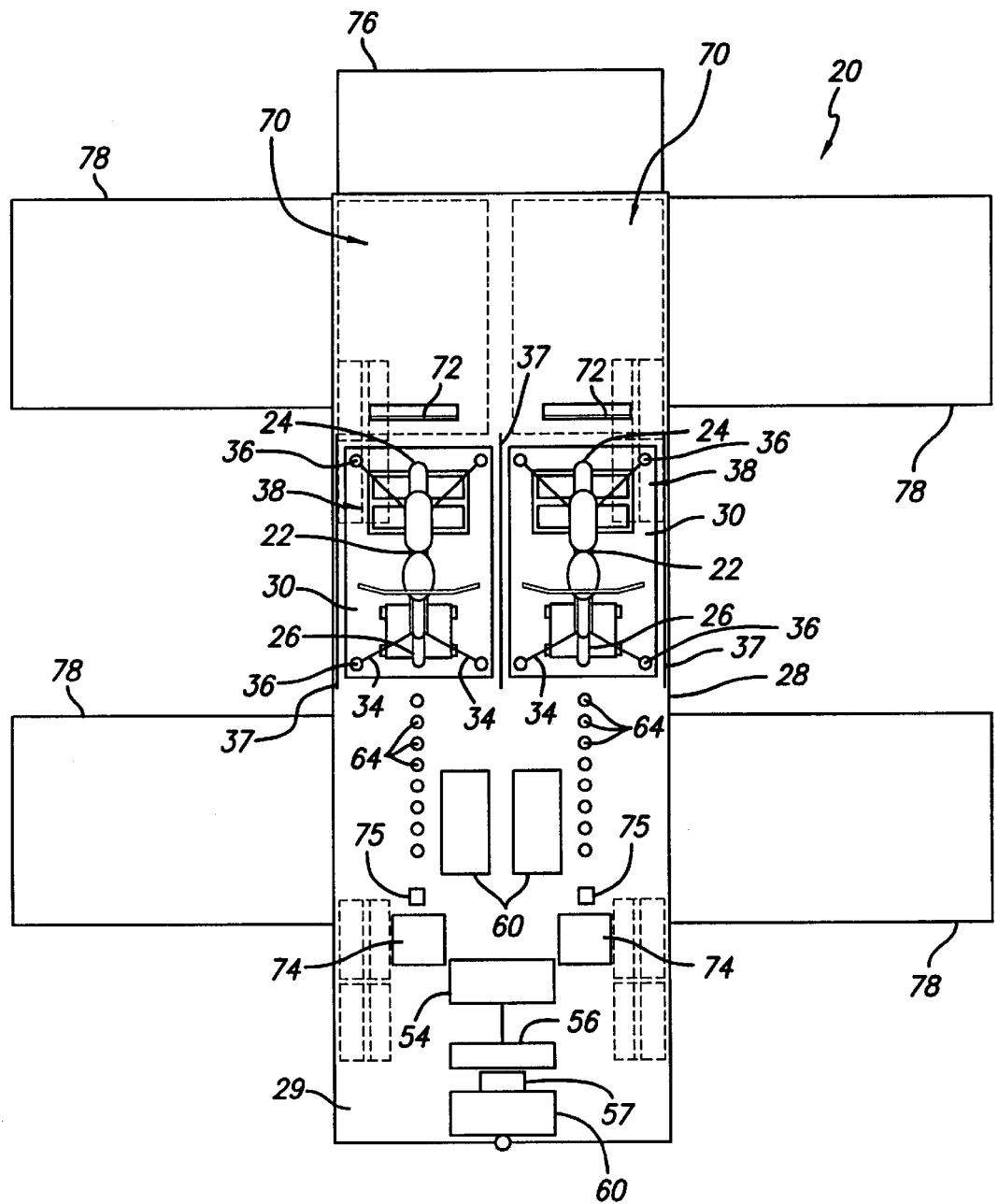
FIG. 1 is a schematic diagram showing a general overview of the drag racing simulation system of the invention.
Figure 2:
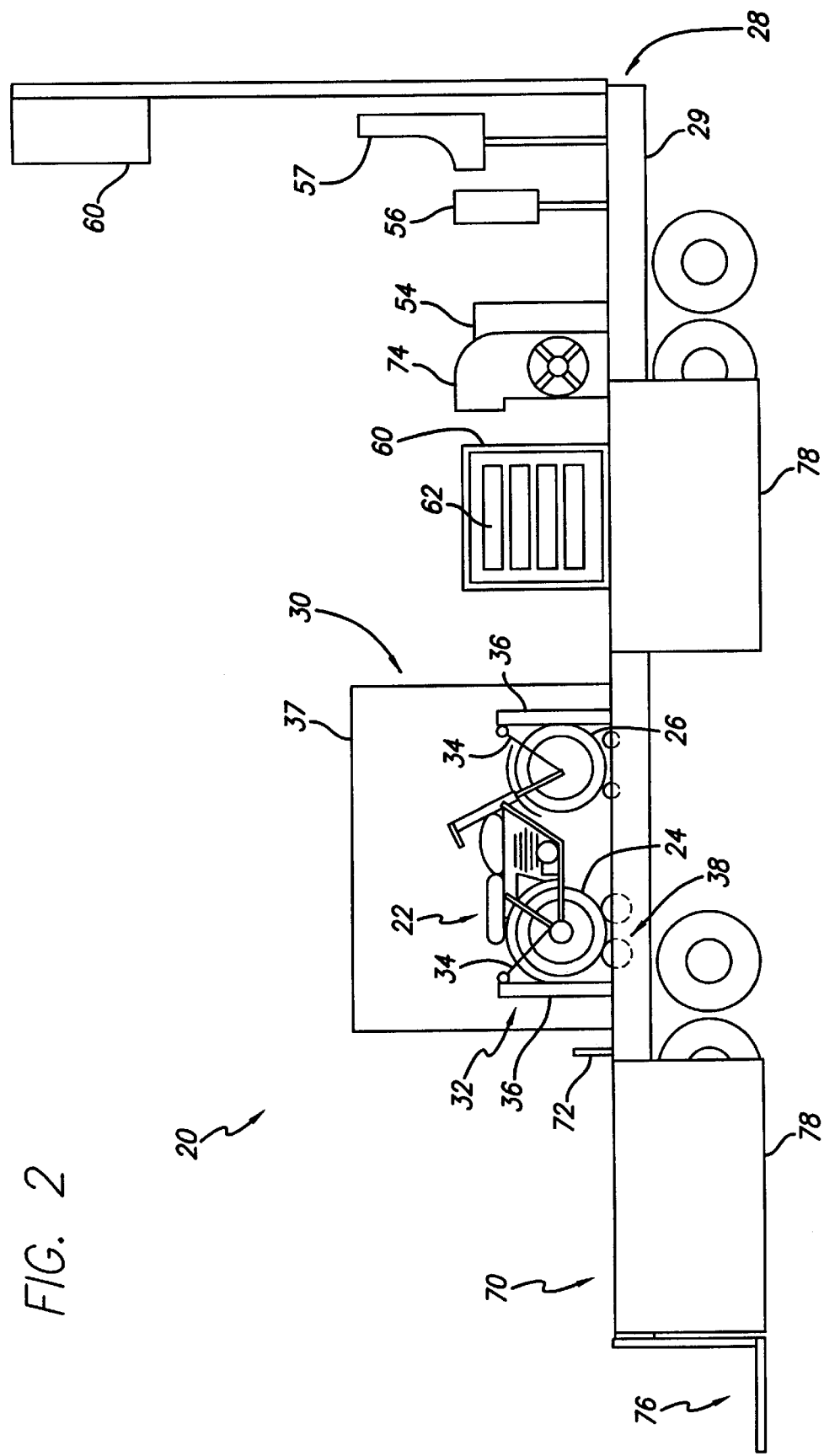
FIG. 2 is a side elevation view of the drag racing simulation system of FIG. 1.

As is illustrated in the drawings, the invention is accordingly embodied in a drag racing simulation system 20, shown generally in FIGS. 1 and 2, for a vehicle such as a motorcycle 22, having a drive wheel 24 and an opposing wheel balancing the vehicle, such as a front wheel 26 in rear wheel drive vehicles, for simulating drag racing while the motorcycle remains stationary, although the drag racing simulation system is equally applicable for use with other motorized vehicles such as cars and trucks, as well as non-motorized vehicles such as bicycles and the like having a drive wheel and an opposing wheel balancing the vehicle, such as a front wheel, although the system of the invention would be equally applicable to front wheel drive vehicles. The drag racing simulation system preferably includes a racing platform 28 upon which the vehicles can engage in simulated competition drag racing, and which is preferably viewable by spectators. The racing platform is also preferably portable, so that it could for example, be moved into a stadium, or so that bleachers could be readily brought nearby; and in one presently preferred embodiment, the racing platform comprises a flatbed 29 of a truck. The racing platform could also be placed on a trailer, or made similar to a mobile home, so that the racing platform could be towed to a performance location and stationed appropriately for competition and viewing.

Figure 3:
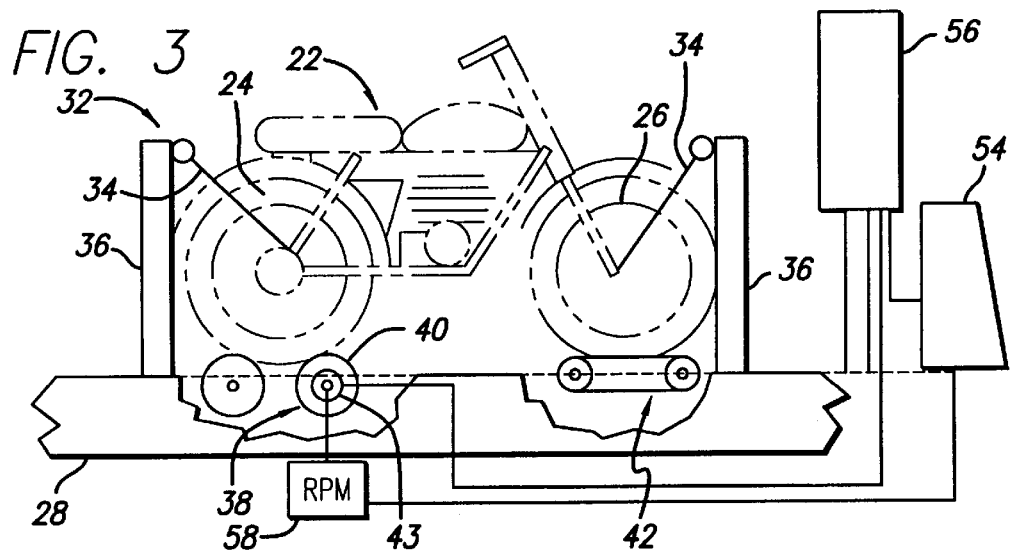
FIG. 3 is a cutaway view of a portion of the drag racing platform of the drag racing simulation system of FIG. 1 showing a first preferred embodiment of a rotatable drive wheel support member.
Figure 4:
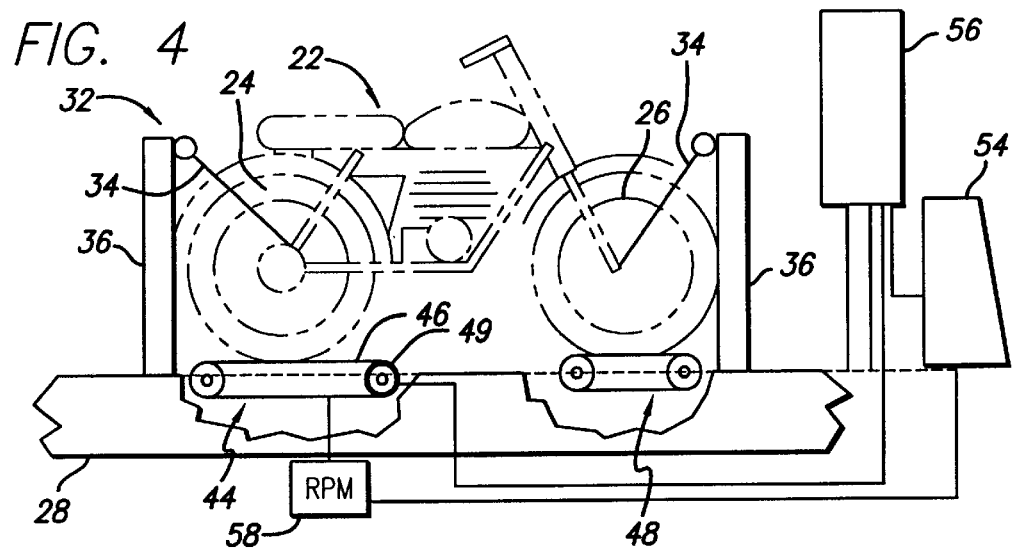
FIG. 4 is a cutaway view similar to that of FIG. 3 of a portion of the drag racing platform of the drag racing simulation system of the invention showing a second preferred embodiment of a rotatable drive wheel support member including a drive wheel treadmill for the drag racing simulation system of the invention.
Figure 5:
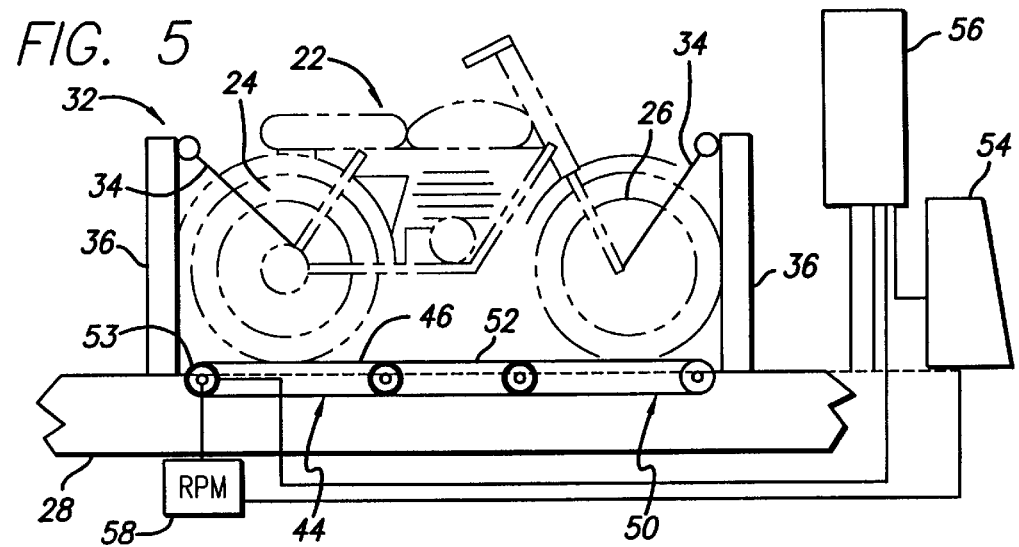
FIG. 5 is a cutaway view similar to that of FIG. 3 of a portion of the drag racing platform of the drag racing simulation system of the invention showing a third preferred embodiment of a rotatable drive wheel support member including a drive wheel treadmill linked to a front wheel treadmill for the drag racing simulation system of the invention.

The racing platform preferably has a plurality of drag racing simulation areas 30 for accommodating one or more competing vehicles, with each drag racing simulation area having a restraining assembly 32 best seen in FIGS. 3, 4 and 5 for securing the vehicle to the platform in a generally upright position while allowing substantial freedom of movement of the vehicle within the drag racing simulation area. In one presently preferred embodiment, illustrated in FIGS. 1 and 2, the restraining assembly includes a plurality of elastic cords 34, such as bungee cords, for example, secured to posts 36 mounted on the platform around the drag racing simulation area, so that the vehicles are allowed limited movement within safe limits to prevent injury to the rider, such as to prevent the vehicles from being driven off the platform or falling over, while allowing to allow limited yaw, pitch and roll movement of the vehicles, as well as vertical, and horizontal forward and backward and side-to-side movement to offer a more challenging and realistic drag racing competition. Alternatively, the vehicles could be restrained by coiled springs, a straps attached to springs, or the like. In a presently preferred embodiment, four or more elastic bungee cords connected to four posts in each drag racing simulation area are used to secure each motorcycle to the platform. Plexiglass panels 37 can additionally be installed on the drag racing platform between the drag racing simulation areas to further protect the contestants from injury while permitting spectators to view the contestants and permitting the contestants to view each other, and outside plexiglass panels can also be installed on drag racing platform to further protect the contestants from falling off of the platform, and to protect spectators.

Each drag racing simulation area preferably includes a rotatable drive wheel support member. As is illustrated in FIG. 3, in one presently preferred embodiment, the rotatable drive wheel support member can include a dynamometer 38, having an outer face 40 for rotatably engaging the drive wheel of the vehicle. Using the restraining assembly 32, the opposing balancing wheel, or typically the front wheel, is secured to the platform, such as on a front treadmill 42 for balancing the front wheel on a level approximately equal to that of the rear drive wheel, and the rear wheel is restrained in rotating engagement with the dynamometer. Each dynamometer can advantageously be provided with a braking mechanism such as brakes 43 for braking the dynamometer, and the braking mechanism is preferably under a master control of an operator of a control unit 56, to be described further hereinafter, for bringing each of the vehicles to a halt and stopping the competition.

Referring to FIG. 4, in another presently preferred embodiment, the rotatable drive wheel support member can include a drive wheel treadmill 44, having an outer face 46 for rotatably engaging the drive wheel of the vehicle. Using the restraining assembly 32, the opposing balancing wheel, or typically the front wheel, can be secured to the platform, such as on a front treadmill 48 for balancing the front wheel on a level approximately equal to that of the rear drive wheel, and the rear wheel is restrained in rotating engagement with the treadmill. Each drive wheel treadmill can advantageously be provided with a braking mechanism such as brakes 49 for braking the treadmill, and the braking mechanism is preferably under a master control of an operator of the control unit 56, described further below, for bringing the vehicles to a halt and stopping the competition.

With reference to FIG. 5, in another presently preferred embodiment, the rear wheel is restrained in rotating engagement with a first or drive wheel treadmill 44, having an outer face 46 for rotatably engaging the drive wheel. The front wheel is restrained in rotating engagement with a second treadmill 50 that is preferably linked to the first treadmill by a chain drive 52, to provide for a realistic simulation of riding the motorcycles on a roadway. The dual, linked treadmills can advantageously be provided with a braking mechanism such as brakes 53 for braking the drive wheel treadmill and the front wheel treadmill, for bringing the vehicles to a halt and stopping the competition.

Referring again to the general overview of the drag racing simulation system as shown in FIG. 1, the drag racing simulation system preferably farther includes a monitor unit 54 for monitoring the progress of the simulated drag racing, and a control unit 56 for controlling the brakes, the monitor and the operation of the drag racing simulation in general. A chair 57 is also typically provided for an operator near the control unit. In a presently preferred aspect of the invention, at least one sensor 58, illustrated in FIGS. 3, 4 and 5, is connected to the rotatable drive wheel support member for measuring the rotational velocity of the drive wheel and/or the acceleration of the drive wheel. The data generated by the sensor is received by the monitor, and the monitor typically includes a timing mechanism and a microprocessor based system, such as a computer, for determining and displaying such information as the speed, horsepower, revolutions per minute, and forward progress of the vehicles. The monitor also preferably includes one or more displays for displaying information about the drag racing simulation, such as one or more video monitors 60 that may be set up around the drag racing platform for displaying the horsepower, revolutions per minute, simulated speed, and simulated forward progress of the vehicles. In one aspect, the monitor includes a digital display or readout 62 for the numerical information; although this information could also be provided in the form of simulated analog meters or dials; and the monitor also preferably includes a series of lights 64 positioned in front of the vehicles for displaying forward progress of the vehicles by advancing sequences of energized lights.

The control unit 56 also preferably includes means for controlling the brakes, such as a brake pedal or switch (not shown) for an operator of the control unit, such as by electrically activated brakes connected to each of the brakes for controlling the operation of the brakes, although such brakes could also be controlled and activated hydraulically, for example.

In another presently preferred aspect of the drag racing simulation system, best illustrated in FIGS. 1 and 2, the racing platform includes a burnout area 70 at a rear portion of the racing platform, so that the drivers of the vehicles can prepare their drive wheel tires for the drag racing competition in an exhibition burnout period. The burnout area preferably includes one or more flaps 72 capable of being raised to prevent forward progress of the vehicles during the burnout period, and in a presently preferred embodiment, the flap can be raised such that the flap is generally perpendicular to the racing platform, with each flap for restraining one of each of the vehicles during a burnout period. Following the burnout period, the burnout flaps are lowered, so that the vehicles can then advance to the drag racing simulation areas.

In another presently preferred aspect of the drag racing simulation system, also shown in FIGS. 1 and 2, the racing platform includes one or more air blowers 74 at a front portion of the racing platform for blowing air past the vehicles to cool the vehicles. Smoke generators 75, such as smoke pots, for example, may also be provided on the racing platform near the blowers. In addition, the drag racing simulation system may include one or more lifts 76 adjacent to or mounted to the perimeter of the racing platform to facilitate entry and exit of the vehicles, although the lifts can be replaced or supplemented by ramps 78 or a similar suitable means.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A drag racing simulation system for a vehicle having a drive wheel, for simulating drag racing while the vehicle remains stationary, the system comprising:

a racing platform having a drag racing simulation area;

a restraining assembly comprising a plurality of elastic cords secured between the vehicle and the platform for securing the vehicle to said platform in a generally upright position while allowing substantial restrained freedom of movement of the vehicle within said drag racing simulation area;

a rotatable drive wheel support member having an outer face for rotatably engaging the drive wheel of the vehicle; and at least one sensor for monitoring the progress of the simulated drag racing.

2. The drag racing simulation system of claim 1, wherein said racing platform has a plurality of drag racing simulation areas for simultaneous simulation of drag racing of a plurality of vehicles.

3. The drag racing simulation system of claim 1, wherein said restraining assembly comprises allows limited yaw, pitch and roll movement of the vehicle, as well as vertical, and horizontal forward and backward and side-to-side movement.

4. The drag racing simulation system of claim 1, wherein said racing platform comprises a plurality of posts disposed around said drag racing simulation area, and said elastic cords are secured to said posts.

5. The drag racing simulation system of claim 1, wherein said racing platform comprises a flatbed of a truck.

6. The drag racing simulation system of claim 1, wherein said rotatable drive wheel support member comprises a treadmill.

7. The drag racing simulation system of claim 1, wherein said rotatable drive wheel support member comprises a dynamometer.

8. The drag racing simulation system of claim 1, wherein the vehicle has a front wheel and a rear wheel, the rear wheel is the drive wheel, and the front wheel is restrained in rotating engagement with a second rotatable support member.

9. The drag racing simulation system of claim 8, wherein said rotatable drive wheel support member comprises a first treadmill and said second rotatable support member comprises a second treadmill linked to said first treadmill such that said first treadmill drives said second treadmill.

10. The drag racing simulation system of claim 1, wherein said at least one sensor comprises a sensor connected to said rotatable drive wheel support member for measuring the rotational velocity of the drive wheel.

11. The drag racing simulation system of claim 1, further comprising at least one monitor for displaying at least one of the horsepower, revolutions per minute, simulated speed, simulated acceleration, and simulated forward progress of the vehicle.

12. The drag racing simulation system of claim 11, further comprising a series of lights positioned in front of the vehicle for displaying the simulated forward progress of the vehicle.

13. The drag racing simulation system of claim 11, farther comprising a control unit for controlling said at least one monitor.

14. The drag racing simulation system of claim 13, wherein the control unit further comprises means for braking the rotatable drive wheel support member for stopping the vehicle.

15. The drag racing simulation system of claim 1, wherein the racing platform further comprises a burnout area, the burnout area including a flap movable between a lowered position and a raised position in which the flap is perpendicular to the racing platform for restraining the vehicle from forward movement during a burnout period.

16. A drag racing simulation system for a plurality of vehicles, each of the vehicles having a drive wheel, for simulating drag racing while the vehicles remain stationary, the system comprising:

a racing platform having a plurality of drag racing simulation areas;

each of said drag racing simulation areas having a restraining assembly comprising a plurality of elastic cords secured between the vehicles and the platform for securing one of the vehicles to the platform in a generally upright position while allowing substantial restrained freedom of movement of the vehicle within a respective one of the drag racing simulation areas;

each of said drag racing simulation areas having a rotatable drive wheel support member having an outer face for rotatably engaging the respective drive wheel of one of the vehicles; and means for monitoring the progress of the simulated drag racing.

17. The drag racing simulation system of claim 16, wherein said restraining assembly allows limited yaw, pitch and roll movement of the vehicles, as well as vertical, and horizontal forward and backward and side-to-side movement.

18. The drag racing simulation system of claim 17, wherein said racing platform comprises a plurality of posts disposed around each of said drag racing simulation areas, and said elastic cords are secured to said posts.

19. The drag racing simulation system of claim 16, wherein said racing platform comprises a flatbed of a truck.

20. The drag racing simulation system of claim 16, wherein said rotatable drive wheel support member comprises a treadmill.

21. The drag racing simulation system of claim 16, wherein said rotatable drive wheel support member comprises a dynamometer.

22. The drag racing simulation system of claim 16, wherein the vehicles have a front wheel and a rear wheel, the rear wheel is the drive wheel, and each of the front wheels are restrained in rotating engagement with a corresponding second rotatable support member.

23. The drag racing simulation system of claim 22, wherein said rotatable drive wheel support member comprises a first treadmill and said second rotatable support member comprises a second treadmill linked to said first treadmill such that said first treadmill drives said second treadmill.

24. The drag racing simulation system of claim 16, further comprising at least one monitor for displaying at least one of the horsepower, revolutions per minute, simulated speed, simulated acceleration, and simulated forward progress of the vehicles.

25. The drag racing simulation system of claim 24, further comprising a series of lights positioned in front of the drag racing simulation areas for displaying forward progress of the vehicles.

26. The drag racing simulation system of claim 16, further comprising means for braking the rotatable drive wheel support member for stopping the vehicles and the competition.

27. The drag racing simulation system of claim 26, wherein said means for monitoring the progress of the simulated drag racing further comprises means for controlling the means for monitoring, and for controlling the means for braking.

28. The drag racing simulation system of claim 16, wherein the racing platform further comprises a burnout area, the burnout area including at least one flap movable between a lowered position and a raised position in which the flap is perpendicular to the racing platform for restraining the vehicles from forward movement during a burnout period.

29. The drag racing simulation system of claim 16, further comprising an air blower at the front of the racing platform for blowing air past the vehicles to cool the vehicles.

30. A drag racing simulation system for a plurality of motorcycles, each of the motorcycles having a drive wheel, for providing simulated drag racing while the motorcycles remain stationary, the system comprising:

a racing platform having a plurality of drag racing simulation areas;

a plurality of elastic cords securing each of the motorcycles to the platform in a generally upright position within a respective one of the drag racing simulation areas while allowing substantial restrained freedom of movement of the motorcycles to allow limited yaw, pitch and roll movement of the motorcycles, as well as vertical, and horizontal forward and backward and side-to-side movement;

means for rotatably engaging the drive wheels of each of the motorcycles in each of said drag racing simulation areas; and means for monitoring the progress of the simulated drag racing.

31. The drag racing simulation system of claim 30, further comprising means for rotatably engaging the front wheel.

32. The drag racing simulation system of claim 30, further comprising means for linking said means for rotatably engaging the drive wheels and said means for rotatably engaging the front wheel.

33. The drag racing simulation system of claim 30, further comprising means for controlling the means for monitoring.

34. The drag racing simulation system of claim 33, further comprising means for braking the means for rotatably engaging the drive wheels for bringing the motorcycles to a halt and stopping the competition, and wherein the means for controlling the means for monitoring includes means for controlling the means for braking.

35. The drag racing simulation system of claim 34, wherein each said motorcycle has an ignition means for controlling operation of the motorcycle, and said means for controlling comprises means electrically connected to the ignition means of each said motorcycle for interrupting the operation of the motorcycles to stop the motorcycles and stop the competition.

36. The drag racing simulation system of claim 30, further comprising means for cooling the motorcycles.

37. A method for providing simulated drag racing for a plurality of vehicles while the vehicles remain stationary, each of the vehicles having a drive wheel, the steps of the method comprising:

providing a racing platform having a plurality of drag racing simulation areas;

securing each of the vehicles to the platform in a generally upright position by a plurality of elastic cords within a respective one of the drag racing simulation areas for allowing substantial restrained freedom of movement of the vehicle;

rotatably engaging the drive wheels of each of the vehicles; and monitoring the progress of the simulated drag racing.

38. The method of claim 37, wherein said step of monitoring the progress of the simulated drag racing comprises measuring the rotational velocity of the drive wheel.

39. The method of claim 37, wherein said step of monitoring the progress of the simulated drag racing comprises measuring the acceleration of the drive wheel.

40. The method of claim 37, wherein said step of monitoring the progress of the simulated drag racing comprises determining the instantaneous horsepower exerted by the vehicles.

41. The method of claim 37, wherein said step of monitoring the progress of the simulated drag racing comprises displaying information about the drag racing simulation.

42. The method of claim 37, wherein said step of displaying information about the drag racing simulation comprises displaying simulated forward progress of the vehicles.

43. The method of claim 37, further comprising the step of controlling said monitoring of the progress of the simulated drag racing and controlling braking.

44. The method of claim 37, further comprising the step of controlling the operation of the vehicles.

45. The method of claim 37, wherein said step of controlling the operation of the vehicles comprises controlling the supply of electrical ignition energy to the vehicles.

46. The method of claim 37, furtherer comprising the step of cooling the vehicles.

47. The method of claim 37, wherein said step of securing each of the vehicles to the platform comprises restraining said vehicles to allow limited yaw, pitch and roll movement of the vehicles, as vertical, and horizontal forward and backward and side-to-side movement.

48. A drag racing simulation system for a vehicle having a drive wheel, for simulating drag racing while the vehicle remains stationary, the system comprising:

a racing platform having a drag racing simulation area;

a restraining assembly comprising a plurality of elastic cords secured between the vehicle and the platform for securing the vehicle to said platform in a generally upright position for restraining movement of the vehicle;

a rotatable drive wheel support member having an outer face for rotatably engaging the drive wheel of the vehicle; and at least one sensor for monitoring the progress of the simulated drag racing.

49. The drag racing simulation system of claim 48, wherein said racing platform has a plurality of drag racing simulation areas for simultaneous simulation of drag racing of a plurality of vehicles.

50. The drag racing simulation system of claim 48, wherein said racing platform comprises a plurality of posts disposed around said drag racing simulation area, and said elastic cords are secured to said posts.

51. The drag racing simulation system of claim 48, wherein said racing platform comprises a flatbed of a truck.

52. The drag racing simulation system of claim 48, wherein said rotatable drive wheel support member comprises a treadmill.

53. The drag racing simulation system of claim 48, wherein said rotatable drive wheel support member comprises a dynamometer.

54. The drag racing simulation system of claim 48, wherein the vehicle has a front wheel and a rear wheel, the rear wheel is the drive wheel, and the front wheel is restrained in rotating engagement with a second rotatable support member.

55. The drag racing simulation system of claim 54, wherein said rotatable drive wheel support member comprises a first treadmill and said second rotatable support member comprises a second treadmill linked to said first treadmill such that said first treadmill drives said second treadmill.

56. The drag racing simulation system of claim 48, wherein said at least one sensor comprises a sensor connected to said rotatable drive wheel support member for measuring the rotational velocity of the drive wheel.

57. The drag racing simulation system of claim 48, further comprising at least one monitor for displaying at least one of the horsepower, revolutions per minute, simulated speed, simulated acceleration, and simulated forward progress of the vehicle.

58. The drag racing simulation system of claim 57, further comprising a series of lights positioned in front of the vehicle for displaying the simulated forward progress of the vehicle.

59. The drag racing simulation system of claim 57, further comprising a control unit for controlling said at least one monitor.

60. The drag racing simulation system of claim 59, wherein the control unit further comprises means for braking the rotatable drive wheel support member for stopping the vehicle.

61. The drag racing simulation system of claim 48, wherein the racing platform further comprises a burnout area, the burnout area including a flap movable between a lowered position and a raised position in which the flap is perpendicular to the racing platform for restraining the vehicle from forward movement during a burnout period.

62. A method for providing simulated drag racing for a plurality of vehicles while the vehicles remain stationary, each of the vehicles having a drive wheel, the steps of the method comprising:

providing a racing platform having a plurality of drag racing simulation areas;

securing each of the vehicles to the platform in a generally upright position by a plurality of elastic cords within a respective one of the drag racing simulation areas for restraining movement of the vehicles;

rotatably engaging the drive wheels of each of the vehicles; and monitoring the progress of the simulated drag racing.

63. The method of claim 62, wherein said step of monitoring the progress of the simulated drag racing comprises measuring the rotational velocity of the drive wheel.

64. The method of claim 62, wherein said step of monitoring the progress of the simulated drag racing comprises measuring the acceleration of the drive wheel.

65. The method of claim 62, wherein said step of monitoring the progress of the simulated drag racing comprises determining the instantaneous horsepower exerted by the vehicles.

66. The method of claim 62, wherein said step of monitoring the progress of the simulated drag racing comprises displaying information about the drag racing simulation.

67. The method of claim 62, wherein said step of displaying information about the drag racing simulation comprises displaying simulated forward progress of the vehicles.

68. The method of claim 62, further comprising the step of controlling said monitoring of the progress of the simulated drag racing and controlling braking.

69. The method of claim 62, further comprising the step of controlling the operation of the vehicles.

70. The method of claim 62, wherein said step of controlling the operation of the vehicles comprises controlling the supply of electrical ignition energy to the vehicles.

71. The method of claim 62, further comprising the step of cooling the vehicles.

* * * * *

UNITED STATES PATENT AND TRADEMARK OFFICE
CERTIFICATE OF CORRECTION

PATENT NO.   : 6,123,547
DATED        : September 26, 2000
INVENTOR(S)  : Joseph Teresi It is certified that error appears in the above-identified patent and that said Letters Patent is hereby corrected as shown below:

Title page,
Under "U.S.PATENT DOCUMENTS", add the following:

| -- 1,354,021 | 9/1920  | H. Clegg       |
|    1,511,496 | 10/1924 | E.H. Belden    |
|    2,287,084 | 6/1942  | C.C. Benett    |
|    2,504,007 | 4/1950  | A. Declercq    |
|    3,827,292 | 8/1974  | Zelson         |
|    4,214,381 | 7/1980  | Clark et al.   |
|    4,385,518 | 5/1983  | Rickett        |
|    4,978,300 | 12/1990 | Letovsky et al.|
|    4,991,514 | 2/1991  | Powell et al.  |
|    5,010,763 | 4/1991  | Schneider      |
|    5,361,705 | 11/1994 | Powell         |
|    5,711,670 | 11/1998 | Barr --.       |

Column 7, claim 3,
Line 11, omit "comprises".

Signed and Sealed this

Thirteenth day of November, 2001

*Attest:*

NICHOLAS P. GODICI
*Attesting Officer*  *Acting Director of the United States Patent and Trademark Office*